United States Patent [19]

Becker et al.

[11] Patent Number: 4,583,929
[45] Date of Patent: Apr. 22, 1986

[54] APPARATUS FOR MANUFACTURING AN OPTICAL CABLE ELEMENT

[75] Inventors: Johann A. Becker, Overath; Werner Zell, Cologne, both of Fed. Rep. of Germany

[73] Assignee: U.S. Philips Corporation, New York, N.Y.

[21] Appl. No.: 582,428

[22] Filed: Feb. 22, 1984

[30] Foreign Application Priority Data

Feb. 25, 1983 [DE] Fed. Rep. of Germany ....... 3306603
Mar. 17, 1983 [DE] Fed. Rep. of Germany ....... 3309573

[51] Int. Cl.⁴ .............................................. G02B 6/44
[52] U.S. Cl. ...................... 425/71; 264/1.5; 264/173; 264/235; 425/113; 425/404
[58] Field of Search ............ 264/1.5, 173, 230, 209.3, 264/209.4, 289.6, 342 R, 342 RE, DIG. 71, 235; 425/113, 71, 404, 446

[56] References Cited

U.S. PATENT DOCUMENTS

| | | | |
|---|---|---|---|
| 2,070,252 | 2/1937 | Borner | 264/342 R |
| 2,956,330 | 10/1960 | Pitzl | 264/289.6 |
| 3,041,673 | 7/1962 | Goodwine | 425/113 |
| 3,444,289 | 5/1969 | Hedberg et al. | 425/445 |
| 3,679,791 | 7/1972 | Reade | 264/342 RE |
| 3,690,796 | 9/1972 | Borsvold | 425/113 |
| 4,154,783 | 5/1979 | Jackson | 264/1.5 |
| 4,226,653 | 10/1980 | Oestreich | 156/73.5 |
| 4,414,165 | 11/1983 | Oestreich et al. | 264/1.5 |
| 4,458,476 | 7/1984 | Mayr et al. | 264/173 |

FOREIGN PATENT DOCUMENTS

| | | | |
|---|---|---|---|
| 2845887 | 4/1980 | Fed. Rep. of Germany | 264/1.5 |
| 28703 | 7/1972 | Japan | 264/209.3 |

Primary Examiner—James Lowe
Attorney, Agent, or Firm—Marc D. Schechter

[57] ABSTRACT

A method of manufacturing an optical cable element in which a synthetic resin envelope is extruded around one or more optical fibers at elevated temperature. The element is then cooled and wound on a reel in which, after cooling, the element is again heated and maintained (tempered) at the heating temperature to irreversibly shrink the synthetic resin envelope.

5 Claims, 3 Drawing Figures

U.S. Patent  Apr. 22, 1986  4,583,929 ations, uncontrolled, irreversible
APPARATUS FOR MANUFACTURING AN OPTICAL CABLE ELEMENT

BACKGROUND OF THE INVENTION

The invention relates to a method of manufacturing an optical cable element. In the method, a synthetic resin envelope is extruded around one or more optical fibers at elevated temperature and the element is then cooled and wound on a reel.

Such a method is described in U.S. Pat. No. 4,414,165. According to this known method, a loose synthetic resin envelope (coating) is extruded around an optic fiber. After extrusion, the envelope is cooled to a temperature which is higher than room temperature. At this temperature, the cable element is reeled. While the element is wound, the optical fiber is braked. As a result, the fiber will be situated at the smallest radius of curvature within the envelope. With respect to the envelope the optical fiber then has an underlength.

The optical cable element is then further cooled to room temperature. As a result of the thermal contraction of the envelope, the length of the optical fiber increases with respect to that of the envelope. It is possible to determine and adjust the relative length of the fiber with respect to the envelope by determining and adjusting the degree of contraction of the envelope. As a result of this, for example, the previously adjusted underlength can be compensated or even overcompensated so that optical cable elements are obtained whose fibers have overlengths.

It is known that the optical transmission properties of optical cable elements depend very considerably on the overlength of the optical fibers and therefore on the reversible expansion and contraction ranges of the fiber envelope. For example, when the overlength is too large, the fiber is forced against the inner wall of the envelope after the envelope undergoes only a small contraction. As a result, the damping may increase considerably.

When the overlength is too small, the same problem will occur after the envelope undergoes a small expansion. The expansion and contraction ranges of the envelope, in which optical ratios are substantially constant, is also determined by the adjusted overlength. An adjusted overlength is therefore required to be maintained as much as possible after the manufacture of the element.

It has been found that in optical cable elements in which the overlength is adjusted by the reversible thermal contraction of the envelope, this requirement cannot substantially be fulfilled. This is particularly so when after the manufacture of the optical cable elements they are exposed to comparatively high temperatures, for example in further processing steps or as a result of intensive radiation by the sun upon storage in the open air. As a result of the influence of the temperature, the overlengths of the optical fibers changes as compared with the initially adjusted overlength. This change is not fully compensated when the temperature decreases, so that the optical transmission properties vary uncontrollably.

SUMMARY OF THE INVENTION

It is an object of the invention to provide a method of manufacturing an optical cable element in which the adjusted overlength of the fiber is maintained.

According to the invention, this object is achieved by a method in which, after cooling, the element is again heated, is maintained (tempered) at the heating temperature for some time, and is finally cooled to room temperature.

Experiments underlying the invention have demonstrated that the reversible thermal expansion and contraction of the synthetic resin envelope is accompanied with an irreversible contraction which will hereinafter be called shrinkage. This shrinkage must be considered as an irreversible reduction in volume and length occurring in the course of time. The process of shrinkage is considerably accelerated as a result of the thermal treatment according to the invention. The shrinkage process is entirely or nearly completed during the thermal treatment according to the invention.

The process according to the invention may be used in the manufacture of an optical cable element in which the synthetic resin envelope engages the optical fiber or fibers. The envelope undergoes no uncontrollable shrinkage over time so that consequently the fiber is no longer subjected to uncontrollable pressure by the envelope.

The invention is preferably used in the manufacture of optical cable elements comprising a loose synthetic resin envelope (coating) around the fiber or fibers. In this case, the shrinkage of the envelope caused during the thermal treatment is used to produce an overlength of the optical fiber in the envelope.

In a particular embodiment of the method according to the invention, a loose synthetic resin envelope is extruded at elevated temperature around a fiber to form a cable element. The element is cooled and reeled and the position of the optical fiber with respect to the envelope is fixed. The reeled element is then heated and maintained at the heating temperature for some time. Thereafter, the element is cooled, and a fiber overlength is obtained as a result of the shrinkage of the envelope.

The shrinkage process can hence be used in the adjustment of the overlengths of optical fibers in optical cable elements. For example, after the optical fiber is initially positioned within the envelope, for example to form an underlength, the envelope is shrunk until the desired overlength has been obtained. The value of the produced overlength depends on various parameters as will be explained hereinafter, for example on the tempering (maintaining at the heating temperature) time, the cooling rate of the envelope just after extrusion, the initial position between fiber and envelope, etc.

The method according to the invention has the advantage that after the shrinkage process is terminated, substantially no large irreversible changes in the length of the envelope occur as a result of renewed exposure to higher tempertures. Hence, uncontrolled, irreversible changes of the adjusted overlength no longer occur as has been demonstrated by experiments with a variety of envelope materials.

According to an advantageous further embodiment of the invention, the heating temperature is just below the softening temperature of the synthetic resin. Synthetic resins have the advantage of having a comparatively strong shrinkage ratio so that comparatively large overlengths can be obtained. By choosing the heating temperature just below the softening temperature of the synthetic resin the shrinkage process is as complete as possible so that the adjusted overlength is no longer subject to irreversible changes.

According to a modified embodiment of the invention, the friction between optical fiber and the envelope is chosen to be so large that the optical fiber is reeled without an underlength. This means that the fiber extends substantially in the center of the envelope. Such an initial position between fiber and the envelope is required to be able to adjust the desired overlength via the known shrinkage behavior of the envelope.

According to another modified embodiment of the invention, the friction between the optical fiber and the envelope is chosen to be small. The optical fiber is positioned at the smallest radius of curvature in the envelope by braking during reeling of the optical cable element. Alternatively, the optical fiber may be stretched during reeling.

Both methods have the advantage that initially the fiber has an underlength. As a result, the range for adjusting the overlength is increased considerably.

In another modified embodiment of the invention, after extrusion the envelope is cooled at only a low cooling rate.

It has been found that the shrinkage process already partly begins during the extrusion of the envelope. The extrusion shrinkage increases as the cooling rate decreases. By slowly cooling the optical cable element, only a comparatively small shrinkage of the envelope and hence only a small variation in length of the optical cable element occurs in the subsequent heating and tempering treatment. This facilitates the further processing of the cable element after the extrusion. In addition, by varying the cooling rate after extrusion, a further parameter for adjusting the overall shrinkage is obtained.

For heating and tempering, the cable element can be introduced into a heating zone having the desired heating temperature, as a result of which reproducible shrinkage results are obtained.

The tempering time is preferably in the range of hours, which leads to a complete termination of all the shrinkage processes.

In another modified embodiment of the method according to the invention, the optical cable element is reeled on a drum which moves through a heating zone in the axial direction. A continuous, uninterrupted, manufacturing process is obtained by this embodiment.

Experiments have demonstrated that a heating and tempering process according to the invention cannot be combined directly with a usual extrusion process. In an extrusion process, the usual rates of manufacture typically lie in the range of a few meters per minute. The time available for heating and tempering is too small so that the shrinkage cannot be completed.

However, by reeling the cable element on a drum which moves through the heating zone, the time available for heating and tempering the optical cable element can be considerably extended in combination with the usual extrusion and manufacturing velocities. This is achieved by reducing the velocity of the optical cable element after extrusion and cooling by winding it on the drum. For that purpose, the drum moves in the direction of the drum axis. The drum traverses a heating zone whose length is chosen to be so that, with a given rate of manufacture, and with given drum and cable element dimensions, the heating and tempering time required for as complete as possible shrinkage is achieved.

Since the shrinkage process in the subsequent treatment of the optical cable element occurs on the drum itself, the drum is preferably flexible in its radius to allow for contraction of the envelope and complete shrinkage. The drum preferably moves continually in its longitudinal direction so that the turns of the cable element on the drum lie uniformly beside each other.

The invention also relates to a device for continuously manufacturing optical cable elements. The device comprises at least one storage reel for an optical fiber, an extruder for extruding a synthetic resin envelope on the fiber, a cooling bath for cooling the extruded envelope, a drum for reeling the optical cable element, as well as a heating furnace. The drum is axially movable through the heating furnace.

DESCRIPTION OF THE PREFERRED EMBODIMENTS

Figure 1:
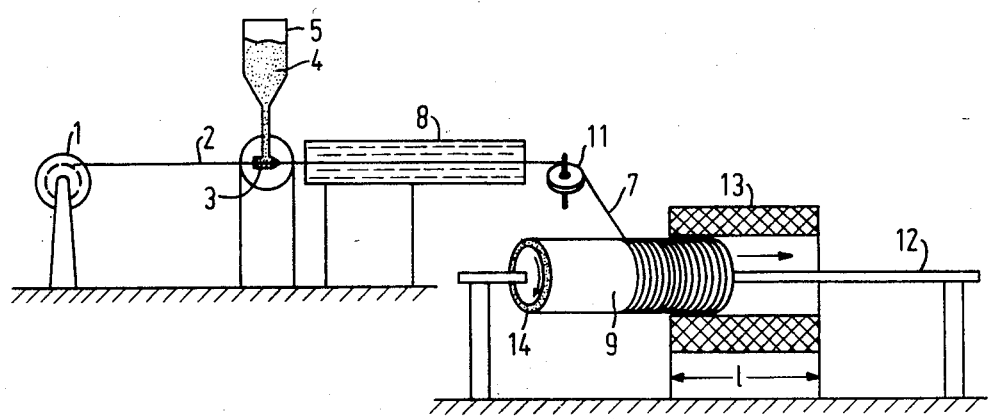
FIG. 1 schematically shows a device for manufacturing optical cable elements having selected overlengths in an uninterrupted (continuous) manufacturing process.

FIG. 1 shows a device for manufacturing optical cable elements having synthetic resin envelopes. The cable elements are used for the transmission of optical signals.

The device comprises a storage reel 1 on which the optical fiber 2 to be enveloped is reeled. The optical fiber 2 is guided through an extrusion device 3. Extrusion device 3 is fed from a container 5 filled with a synthetic resin granulate 4 and provides the optical fiber 2 with a loose synthetic resin envelope 6 (see FIG. 2). Of course, several optical fibers 2 may alternatively be present in the synthetic resin envelope 6.

The synthetic resin used to produce the envelope 6 is, for example, a partly crystalline thermoplast (for example polypropylene, polyethylene, polyurethane, or polyvinylidene fluoride) or an amorphous synthetic resin (for example PVC).

The optical cable element 7 comprising optical fiber 2 and synthetic resin envelope 6 may also include a gel in the envelope 6 for example to improve its optical properties. The cable element is then applied to a cooling section 8 for slow cooling. The cooling section 8 may be, for example, a temperature-controlled water bath having a variable length.

The optical cable element 7 is then wound on a (storage) drum 9, for example via a guide roller 11. The drum moves continuously in the direction of the drum axis 12 while it rotates around the axis. The drum 9 passes through a furnace 13 at a low speed so that the optical cable elements 7 wound on the drum 9 can be tempered.

Figure 2:
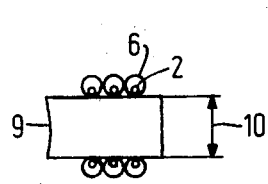
FIG. 2 schematically shows a cable element reeled on a drum.

While winding the optical cable element 7 on the drum 9, the braking force on the optical fiber 2 is chosen so that the friction between the optical fiber 2 and the envelope 6 over the whole length between the extruder 3 and the drum 9 is overcome. As a result, the optical fiber 2 engages the inner wall of the envelope 6 when the cable element 7 is wound on drum 9. This is shown in FIG. 2.

In this manner, the optical fiber 2 has an underlength with respect to the envelope 7. The underlength is determined inter alia, by the diameter 10 of the drum 9 and may have a value up to one percent. A certain initial position between the optical fiber 2 and the envelope 6 is thus fixed for the production of an optical cable element 7 having an optical fiber 2 with a defined and reproducible overlength.

The shrinkage of the envelope 6 for adjusting the desired overlength of the optical fiber 2 relative to the envelope 6 is then induced by the tempering of the optical cable element 7 in the furnace 13. The furnace 13 heats element 7 to a temperature just below the softening temperature of the synthetic resin. By means of the drum 9, the translational movement of the optical fiber 2 unreeled from the storage reel 1 at the velocity $V_1$ is converted into a movement with considerably lower velocity $V_2$.

For example, when the cable element 7 has an extrusion rate $V_1$ of 10 m/min and an outside diameter of 1.5 mm, and the drum has a diameter of 30 cm and a speed of rotation of 10 rpm, the tempering velocity $V_2$ of the drum 9 in the direction of the drum axis 12 is of at least 15 mm/min. For a six hour tempering in the heated zone of the furnace 13, the heated zone must have a length of 5.40 meters. Of course, the drum 9 may be longer. The translation velocity $V_1$ has hence been reduced by the ratio 666:1. Even at considerably higher extrusion velocities $V_1$, tempering times can still be obtained in which relatively complete shrinkage of the envelope material can be achieved. Typical extrusion velocities $V_1$ can be reduced by the ratio 100:1 to approximately 1000:1.

In order to induce complete shrinkage, the drum 9 is preferably provided on its outside with a layer 14 of a compressible material, for example a foam material. This is so that as the optical element 7 contracts, layer 14 will become compressed.

Figure 3:
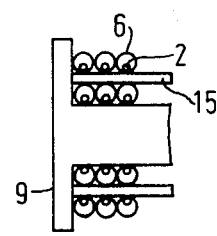
FIG. 3 schematically shows several layers of an optical cable element on a drum.

In a further preferred embodiment shown in FIG. 3 additional elastic layers 15, for example made of foam, are present between layers of optical cable element 7 so that the envelope 6 of the lower optical cable element 7 can shrink in the same manner as the upper envelope.

After the tempering process, the optical cable element 7 is cooled to room temperature, for example by removing the drum 9 from the furnace 13. Due to the irreversible shortening of the envelope 6, the underlength is compensated or overcompensated so that the optical fiber 2 has an overlength.

As a result of tempering element 7 near the softening temperature of the synthetic resin 6, no further irreversible variations in the length of the synthetic resin envelope 6 can be induced by subsequent temperature changes. The amount of overlength desired can thus be set reproducibly.

Large overlengths are required, for example, for expandable cable cores in air cables.

However, the heating temperature may also be lower than just below the softening temperature of the synthetic resin. In this case it should be ensured that the optical cable element is not afterwards heated above the tempering temperature. In any case the heating temperature must be so high that an irreversible the envelope 6 is irreversibly shrunken by the tempering.

By means of the method and device described, the desired overlength values (even as large as approximately 1% for expandable cable cores in air cables) can be obtained at higher manufacturing velocities $V_1$ in a continuous process.

What is claimed is:

1. A device for manufacturing an optical cable element, said device comprising:
   an extruder for extruding a synthetic resin envelope around an optical fiber, said extruder extruding the envelope at an elevated temperature and at an extrusion velocity;
   a cooling bath for cooling the extruded synthetic resin envelope;
   a furnace having a heating zone for heating the fiber and cooled envelope to a tempering temperature; and
   means for passing the fiber and envelope through the heating zone at a tempering velocity which is substantially less than the extrusion velocity;
   characterized in that the means for passing the fiber and envelope through the heating zone comprises:
   a drum having an axis;
   means for winding the fiber and envelope on the drum around the drum axis; and
   means for moving the drum through the heating zone in the direction of the drum axis.

2. A device as claimed in claim 1, characterized in that the ratio of the extrusion velocity to the tempering velocity is from 100 to 1000.

3. A device as claimed in claim 2, characterized in that the synthetic resin has a softening temperature, and the tempering temperature is just below the softening temperature of the synthetic resin.

4. A device as claimed in claim 2, characterized in that the drum comprises a layer of compressible material on which the fiber and envelope are wound.

5. A device as claimed in claim 4, characterized in that compressible material is provided between layers of enveloped fiber wound on the drum.

* * * * *